W. A. BANFILL.
LUBRICATOR FOR SHOE MACHINES.
APPLICATION FILED APR. 30, 1908.
908,935.  Patented Jan. 5, 1909.
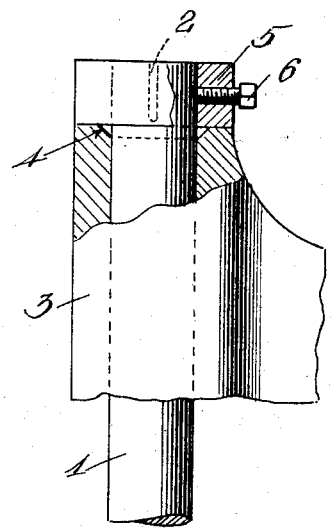
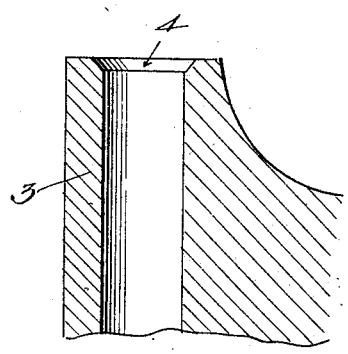
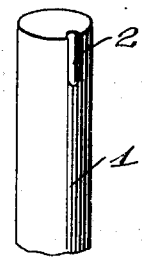
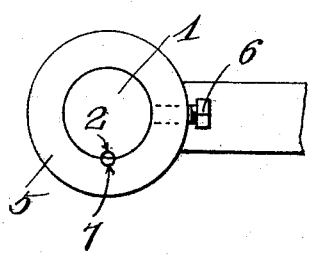
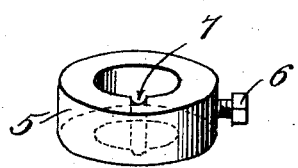
Witnesses
Inventor
W. A. Banfill
By
Attorneys

UNITED STATES PATENT OFFICE.

WILLIAM A. BANFILL, OF IPSWICH, MASSACHUSETTS, ASSIGNOR OF ONE-FOURTH TO WILLIAM V. BURRAGE, OF IPSWICH, MASSACHUSETTS.

LUBRICATOR FOR SHOE-MACHINES.

No. 908,935.     Specification of Letters Patent.     Patented Jan. 5, 1909.

Application filed April 30, 1908. Serial No. 430,176.

*To all whom it may concern:*

Be it known that I, WILLIAM A. BANFILL, a citizen of the United States, residing at Ipswich, in the county of Essex and State of Massachusetts, have invented certain new and useful Improvements in Lubricators for Shoe-Machines; and I do declare the following to be a full, clear, and exact description of the invention, such as will enable others skilled in the art to which it appertains to make and use the same.

This invention relates to improved lubricating means especially adapted for lubricating the head of shoe heel pasting machines.

The object of the invention is to provide an improved oil duct for the head of shoe heel pasting machines whereby the bearing for the axle is thoroughly lubricated without cutting away the axle to an extent sufficient to weaken it.

With these and other objects in view, the invention consists of certain novel features of construction, combination and arrangement of parts, as will be more fully described and particularly pointed out in the appended claim.

In the accompanying drawings, Figure 1 is a side elevation of this improved bearing with parts broken out; Fig. 2 is a detail longitudinal section of the rotary sleeve; Fig. 3 is a plan view of the bearing; Fig. 4 is a side elevation of one end of the axle; Fig. 5 is a perspective view of the collar.

In the embodiment illustrated, a fixed axle 1 is shown having a groove 2 formed longitudinally in one end of the periphery thereof and extending a short distance inwardly. A rotary sleeve 3 is shown mounted on this axle 1 and is provided with a bore, the outer end of which is flared outwardly to form an annular oil chamber 4. A collar 5 is mounted on the outer end of the axle 1 to hold the sleeve in position and is preferably secured thereto by means of a set screw 6. The bore of this collar is preferably provided with a longitudinally extending groove 7 designed to register with the groove 2 formed in the end of the axle 1, said groove 2 being extended a distance equal to the width of the collar only, and thereby preventing weakening of the axle at the part where the greatest strain occurs.

In the operation of this device, the spout of the oil can, (not shown), is applied to the duct formed by the grooves 2 and 7, and the oil injected thereinto passes down into the chamber 4 of the sleeve 3 and is spread inwardly to lubricate the interior of said sleeve to provide for its easy rotation on the axle 1.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

I claim as my invention:

The combination with an axle, of a rotatable tubular member mounted thereon and having the end of its bore flared outwardly, a collar secured to said axle end and abutting against said tubular member, said collar and axle end having registering longitudinally extending grooves arranged to open into the flared bore of said tubular member, the groove in said axle end terminating at the inner end of said collar.

In testimony whereof I have hereunto set my hand in presence of two subscribing witnesses.

WILLIAM A. BANFILL.

Witnesses:
   CHARLES A. SAYWARD,
   HARRY M. SAYWARD.